7799X
W. Easby.
Coffer Dam.
Patented Nov. 19, 1833.
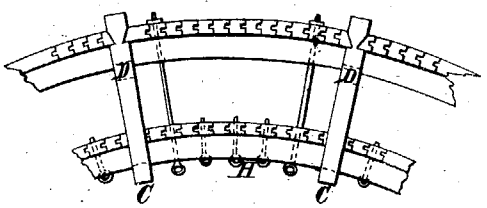
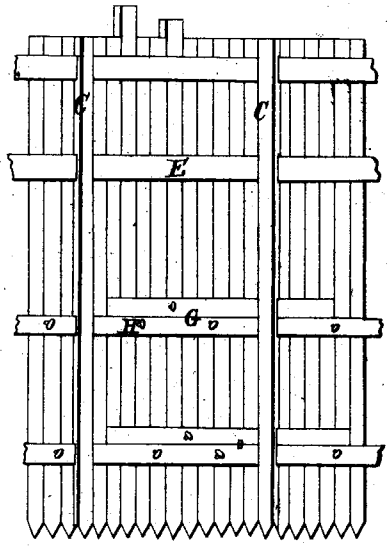
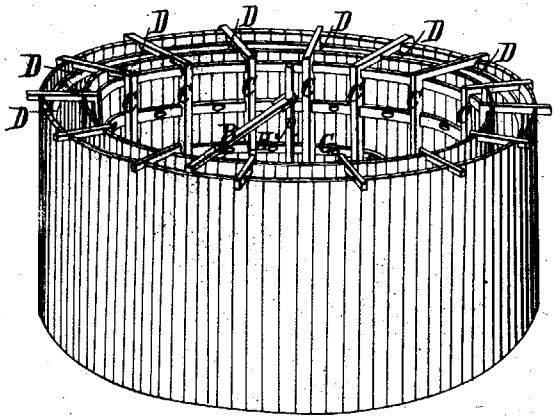

William Easby 7794X Nov 19, 1833

The Schedule referred to in these Letters Patent and mak-
ing part of the same containing a description in the words of
the said William Easby himself of his improvement
in the construction of Coffer Dams.

Be it known that I William Easby of the City of Wash-
ington District of Columbia have made a new and
useful improvement in the construction of Coffer Dams
called Easby's Coffer Dams which is described as foll-
ows. reference being had to the annexed drawings —
This dam is constructed in the following Manner, Wood-
en piles of a suitable length and strength are driven
in by a pile driving Machine in a circular form or
many sided polygon. inclosing the space where the pier
or other work is to be built inside. These piles are shod
at their points with iron or steel, and their heads pro-
tected by iron rings. When cut down to their proper
height. they are also tongued and grooved so as to fit
into each other perfectly. In order to form the circle
it will be necessary first to drive a pile near the
centre of the intended circle. marked A. in the draw-
ing. On this pile place a beam or boom B. turning
on a collar. by which the radius of the circle will be
described. Piles C. will then be driven at about one
foot within — the periphery of the dam and at about
8 feet asunder, another circle D. will be formed at
the distance of about 10 feet outside of the first driving
in piles in the same manner as the first. The heads of
both circles will then be cut off at about 4 feet above
high water at common tides. The frame being now pre-
pared is ready to receive the pile driving engine. A
circle E similar to the upper inner rim will be secu-
red to the out side of the inner tier of piles perpendicularly parallel to the one above mentioned at low water
mark. The piles being properly prepared with their edges
converging to the center of the circle, the driving may be commen-
ced: care however must be taken that the first pile be driven per-
pendicularly and secured to its place by treenails passing thro'
its head and the upper rim, the next pile will be inserted
into the groove of the first, driven home and secured. After
the dam is inclosed the water may be pumped out to 10 ft
below the surface. at which point a rib of oak G. of from
6 to 12 inches thick may be secured on the inside of the dam
or inner circle by large screw eye bolts H. after which the
water may be pumped out to 18 feet and another rib I. in-
serted. The reason for placing these ribs as directed is not
only to regulate the piles and strengthen the dam but
in case any pile should be out of its place it can be brou-
ght into its place again by the screw bolts. Should any
obstruction occur it will be necessary to be provided with
a good oak pile having a steel chisel point with its
head well hooped, this pile is to be used to make way
for the coffer dam pile to be driven. When the bottom or foun-
dation is good one tier of piles only is necessary. When
two ranges of piles are deemed necessary, the process will
be the same the loose mud must be taken from between the
circles & the circles be secured by screw bolts passing from
the exterior circle to the interior circle to prevent them
from being separated by the packing between them.
What I claim as my invention and desire to secure
by Letters Patent is the peculiar construction of the before de-
scribed Coffer dam, but I particularly claim the circular
figure of the dam, whether a perfect circle, oval or a poly-
gonal of many sides dispensing with braces and giving it
[illegible]M.B. greater strength

[illegible]dary Witnesses W. P. Elliot William Easby
Saml. L. Walker [illegible] words